United States Patent [19]

Hughes

[11] 4,324,513

[45] Apr. 13, 1982

[54] TUBULAR KEY MANUFACTURING MACHINE

[76] Inventor: Donald R. Hughes, 2600 Brower Ave., Simi Valley, Calif. 93065

[21] Appl. No.: 119,997

[22] Filed: Feb. 8, 1980

[51] Int. Cl.³ .............................................. B23C 3/35
[52] U.S. Cl. ..................................... 409/82; 76/110
[58] Field of Search ................. 409/81, 82, 229, 83; 76/110

[56] References Cited

U.S. PATENT DOCUMENTS

| | | | |
|---|---|---|---|
| 2,734,426 | 2/1956 | Dix | 409/229 |
| 3,418,882 | 12/1968 | Brand | 409/82 |
| 3,818,798 | 6/1974 | Kotov et al. | 409/82 |

*Primary Examiner*—Z. R. Bilinsky
*Attorney, Agent, or Firm*—Jack C. Munro

[57] ABSTRACT

A machine for the manufacturing of tubular keys wherein the tubular key to be cut is tightly supported within a support means which includes the use of a pivotable indexing plate which will precisely pivot the key to any desired pivotal location. The key is to be lineally movable upon a base in a direction transverse to the longitudinal center axis of the key. A measuring indicator is provided to accurately determine the amount of lineal movement of the key in the transverse direction. A motor driven rotatable cutter is also mounted for lineal movement on the base. The lineal movement of the cutter is parallel to the longitudinal center axis of the key. Another measuring indicator is employed to accurately measure the extent of movement of the cutter with respect to the key. The cutter is capable of being driven at various rotational speeds.

3 Claims, 20 Drawing Figures

TUBULAR KEY MANUFACTURING MACHINE

BACKGROUND OF THE INVENTION

The field of this invention relates to a locksmithing tool and more particularly to a tool which permits the accurate manufacture of a tubular key.

The use of tubular keys is well known. A tubular key provides an alternative form of locking device as opposed to the conventional straight key. Basically, a tubular key is of a cylindrical shape which has a plurality of spaced-apart longitudinal grooves formed upon the periphery of the cylinder. It is through the cooperation of these grooves with a movable pin assembly of a tubular lock that results in operation of the lock.

At times it is necessary to duplicate a tubular key either due to the fact that the tubular key is damaged or lost or a duplicate key is just desired. Therefore, some type of device must be employed to duplicate the key.

Previously, there have been machines constructed which are to duplicate a tubular key. The primary disadvantage of the machines of the prior art have been their failure to be sufficiently accurate. Tubular keys must be manufactured to a reasonably high degree of accuracy. There has not been a relatively low cost tubular key cutting machine which could be available to every locksmith, which could be employed to accurately reproduce tubular keys. The structure of this invention overcomes the aforementioned disadvantage.

SUMMARY OF THE INVENTION

The structure of this invention provides for a simple and efficient way for accurately reproducing a tubular key. Another advantage of the machine of this invention is that the machine can be purchased at a reasonable cost, therefore making the machine readily available to every locksmith.

Although the structure of this invention is designed in particular for use in the manufacturing of tubular keys, the machine can employ additional attachments which results in the machine being usable to manufacture different types of keys. As a result, the machine of the present invention becomes universal and instead of a locksmith buying three or four different machines to duplicate keys, a locksmith is only required to purchase a single machine.

Another advantage of the machine of this invention is that it minimizes wrong key duplicating procedures and requires only a limited amount of skill to effect operation of the machine.

In an effort to avoid redundancy, the tubular key manufacturing machine of this invention is summarily described in the Abstract of the Disclosure.

DETAILED DESCRIPTION OF THE SHOWN EMBODIMENT

Figure 2:
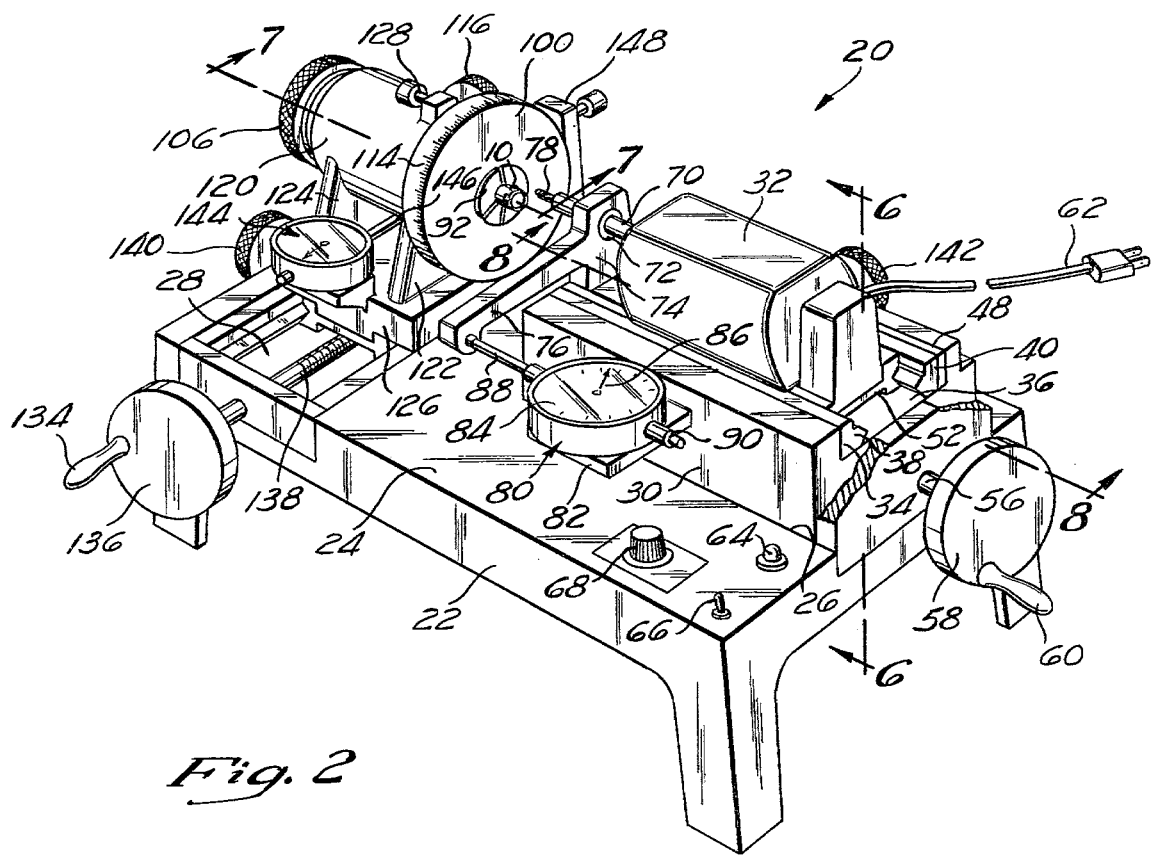
FIG. 2 is a frontal isometric view of the key cutting machine of this invention.
Figure 1:
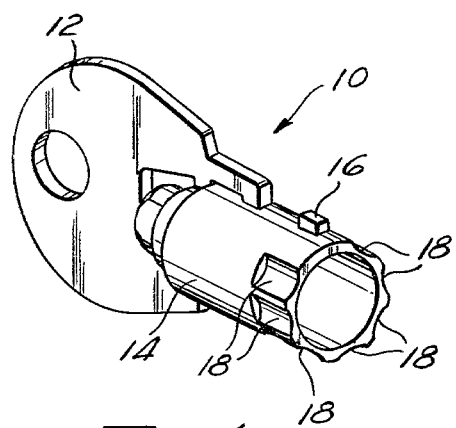
FIG. 1 is a perspective view of a typical tubular key for which the machine of this invention is employed to manufacture.
Figures 3, 4, 5:
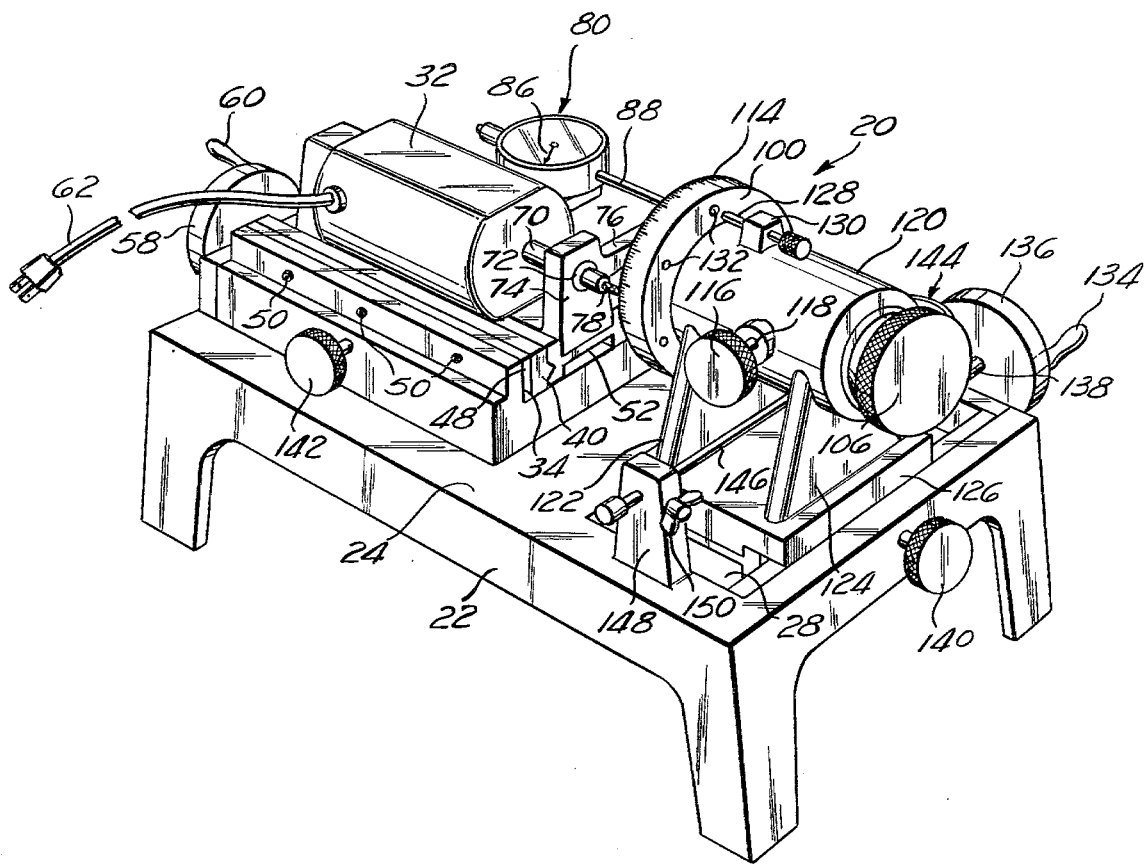
FIG. 3 is a rear isometric view of the cutting machine of this invention.
FIG. 4 is a diagrammatic view depicting the cutting operation for a tubular key within the machine of this invention.
FIG. 5 is a partly-in-cross-sectional view taken along line 5—5 of FIG. 4.

Referring particularly to the drawing, there is shown in FIG. 1, a conventional tubular key 10 which has a handle portion 12 which is secured to a cylindrical section 14. Mounted exteriorly on the cylindrical portion 14 is an aligning protuberance 16. Formed within the exterior of the cylinder 14 and adjacent its outermost edge thereof are a plurality of spaced-apart longitudinal grooves 18. With respect to the center of the cylinder 14, the longitudinal centers of adjacent grooves 18 are forty-five degrees apart. Most keys 10 will have seven in number of grooves 18. However, it is possible for a special type of key to employ eight (more or less) in number of grooves 18.

In connection with the lock (not shown), the key 10 is to cooperate in such a manner that a single locking pin assembly is to connect with a single groove 18. The length of each of the grooves 18 are different but are of the exact length for its particular pin assembly so as to locate each of the pin assemblies within the lock at the shear line. Operation of the lock will then be permitted. The use of a key and a locking mechanism forms no specific part of this invention. The subject matter of this invention has to do with a tubular key machine 20 which is to permit origination and/or duplication of a key 10.

The machine 20 is mounted on a base 22. The base 22 is shown having four supporting legs. Any desirable configuration of base could be employed without departing from the scope of this invention.

The base 22 includes an upper planar surface 24. Formed within the surface 24 are rectangularly shaped openings 26 and 28. The longitudinal center axis of the openings 26 and 28 are located perpendicular to each other. Fixedly secured to the side walls of the opening 26 is a riser block 30. The only purpose of the riser block 30 is to raise the motor 32 a predetermined distance above the surface 24 of the base 22.

Figure 6:
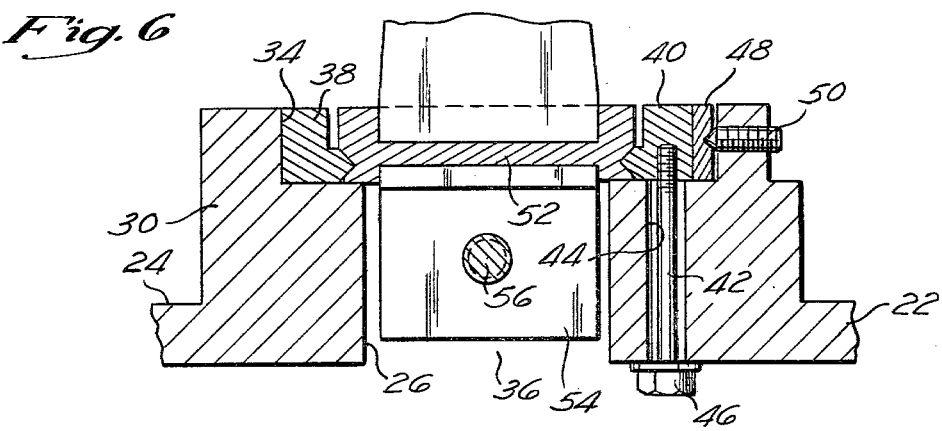
FIG. 6 is a cross-sectional view through the structure employed to effect lineal movement of the rotatable cutter within the machine of this invention taken along line 6—6 of FIG. 2.
Figure 7:
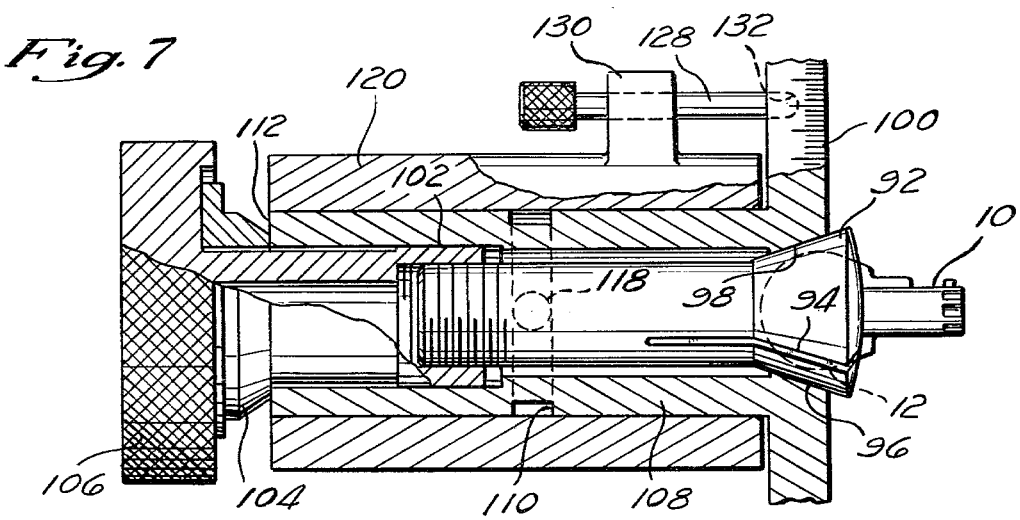
FIG. 7 is a diagrammatic isometric view of the collet used to tightly grip the tubular key within the key cutting machine of this invention during the cutting operation.
Figure 8:
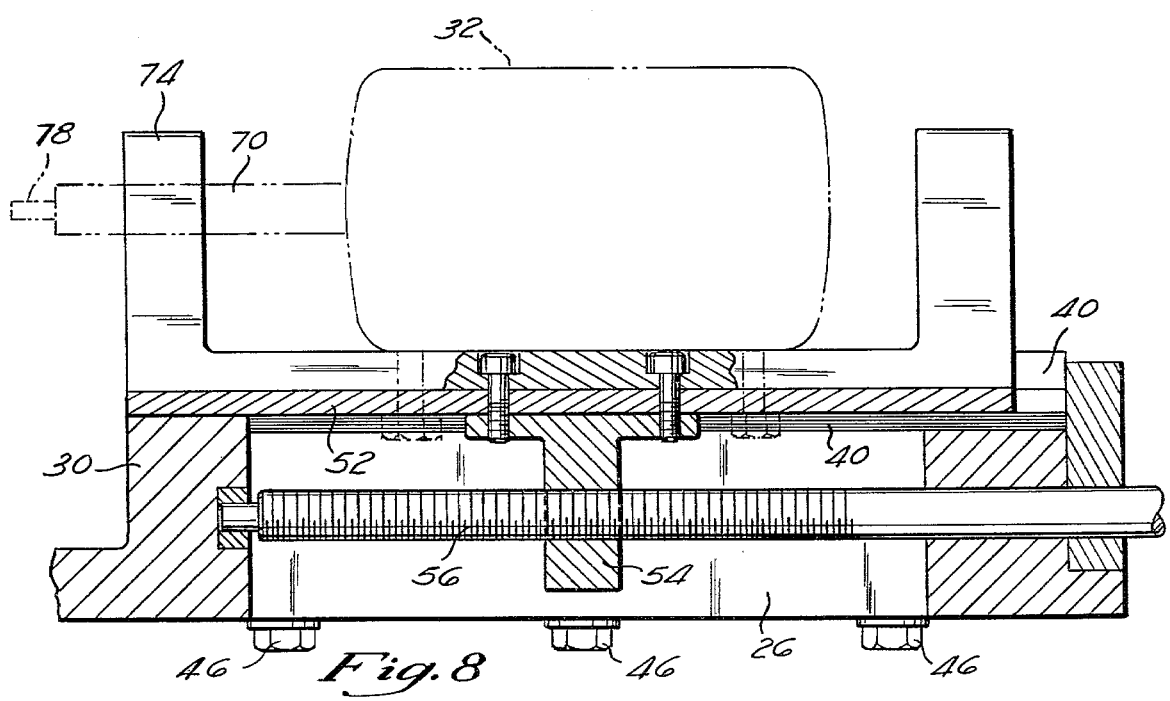
FIG. 8 is a cross-sectional view through the structure employed to effect lineal movement of the rotatable cutter within the machine of this invention taken along line 8—8 of FIG. 2.

The block 30 has an interior elongated channel 34. Centrally located within the channel 34 is an elongated enlarged opening 36. (See FIG. 6.) A male dove-tail bar 38 is fixedly secured to the side wall of the channel 34. A floating dove-tail bar 40 is located at the opposite side wall of the channel 34. The dove-tail protuberances of the bars 38 and 40 face each other.

The floating bar 40 is maintained within the channel 34 by means of a plurality of set screws 42. Each of the set screws 42 are located within a separate oversized hole 44. The oversized holes 44 permits the floating bar 40 to move toward and away from the bar 38. However, the enlarged head 46 of each set screw 44 is tightened sufficiently so that the head 46 abutts with the bottom surface of the block 30 thereby not permitting vertical movement of the bar 40.

Behind the bar 40 is located an abutment bar 48. The bar 48 is connected by a plurality of set screws 50. The set screws 50 are screw fittingly received within a portion of the block 30. Moving of the set screws 50 causes the bar 48 to move against the floating dove-tail bar 40. This in turn causes the floating dove-tail bar 40 to move in respect to the members 38.

In between the members 38 and 40 is mounted a female dove-tail support plate 52. The sides of the support plate 52 are to matingly cooperate with the dove-tail protuberances of the dove-tail bars 38 and 40. The net result is the support plate 52 is capable of limited longitudinal movement within the channel 34, but is held in place transversely with a high degree of accuracy. The set screws 50 are to be adjusted so that the support plate 52 is snugly held in position between the bars 38 and 40.

The bottom surface of the support plate 52 is fixedly secured to an extension 54. This extension 54 is located within the opening 36. The extension 54 is screw threadingly connected to a threaded rod 56. The outer end of the rod 56 is pivotally mounted within the base 22. The outermost end of the rod 56 is attached to a manually operated crank member 58. By turning of the crank member 58 by the handle 60, the extension 54 is moved within the opening 36. As a result, the support plate 52 is similarly moved. This in turn moves the motor 32 which is fixedly mounted on the upper surface of support plate 52. The motor 32 is to be electrically operated through electrical conductor 62 from any conventional source of electrical energy.

Electrically connected in series with the conductor 62 and the motor 32 is a power indicator light 64, an on/off switch 66 and a rheostat which is controlled through knob 68. By turning of the knob 68, the rheostat causes the speed of the motor 32 to be varied. In other words, it can be increased or decreased. This is preferred as a slower speed would be desired for a steel key 10, whereas a higher speed would be more desirable for a brass key 10.

The motor 32 operates through an output shaft 70. The shaft 70 is conducted through a bearing assembly 72 located within an indicator plate 74. This indicator plate 74 is fixedly secured on the support plate 52. The indicator plate 74 includes an outwardly extending arm 76. The function of the arm 76 will be explained further on in the specification.

The outer end of shaft 70 is fixedly secured to a machining tool 78 which will usually take the form of an end mill rotatable about a first axis. However, a chucking device may be employed in conjunction with various types, styles and sizes of drills, end mills, milling cutters, saw blades and/or reamers.

A conventional dial indicator 80 is mounted on a plate 82 which in turn is fixedly secured to the block 30. The dial indicator has an indicator face 84 which has a movable pointer 86 located thereover. Lineal movement of the rod 88 causes movement of the pointer 86. The rod 88 is spring biased towards its outer position. The face 84 will include a measurement scale which will be graduated in 0.001 or 0.0001 inches. The measuring scale and the face 84 can be moved relative to the pointer 86 by turning of knob 90. This means that although the rod 88 is in a position other than its outermost position, the measuring scale on the dial face 84 can be rotated so that the zero value (or any other desirable value) can be located in alignment with the pointer 86. The use of the dial indicator is deemed to be conventional and forms no specific part of this invention. The outer end of the rod 88 is to be contactable by the arm 76. The purpose of this will be explained further on in the specification.

A specifically configured collet 92 is employed to connect with a key 10 and support such in a fixed position. The handle portion 12 of the key 10 is located within a slot formed within the collet 92. The key supporting section of the collet 92 includes a plurality of spaced-apart longitudinal slots 94. The exterior surface of the collet 92 in the area surrounding the key 10 is formed to a bevel 96. Bevel 96 mates with a similarly shaped bevel 98 formed within an indexing plate 100. The inner portion of the collet 92 is threadingly secured to a sleeve 102. The sleeve 102 is fixedly secured to an enlarged knob 106 located about sleeve 102 and abutting knob 106 is a thrust washer 104. Washer 104 is rotatably mounted upon sleeve 102. The function of washer 104 is to distribute the tightening force to eliminate damage to the end 112 of the sleeve 108.

The inner surface of the indexing plate 100 is secured to a sleeve 108. At the approximate longitudinal midpoint of the sleeve 108, there is located a recessed section 110. The sleeve 108 is concentrically disposed about the collet 92 and the sleeve 102. Tightening of the knob 106 with respect to the collet 92 pulls the beveled sections 96 and 90 together and the thrust washer 104 and the end 112 of the sleeve 108. This pulling together causes the slots 94 to become substantially closed and results in the collet 92 tightly gripping the key 10. Release of the key is accomplished by turning of the knob 106 in a direction to cause beveled area 96 to move outwardly from the beveled area 98.

The indexing plate 100 has a measuring scale 114 located entirely about its periphery. Scale 114 will normally be divided into degrees. The indexing plate 100 can be rotated and fixedly positioned in any desired angular position by turning of knob 116 which moves set screw 118 into engagement with the recessed area 110. Set screw 118 is threadably secured within housing 120 which surrounds sleeve 108. The housing 120 is fixedly secured by means of stanchions 122 and 124 to a support plate 126.

Although the indexing plate 100 can be fixed at any desired angular position by means of knob 116 and set screw 118, the common most position would be every forty-five degrees. To accommodate this setting, there is located a pin 128 which is slidably mounted within a block 130 which is fixedly mounted on the housing 120. This locator pin 128 is to connect with any one of several apertures 132 which are formed within the indexing plate 100. Each aperture 132 is located so that the indexing plate 100 may be located at the zero position, the forty-five degree position, the ninety degree position, etc. Locking the indexing plate 100 at each of these respective positions will result in the formation of each of the grooves 18 in their respective and exact position.

It is to be noted that the support plate 126 is mounted within the opening 28 in a dove-tail slot arrangement similar to what was previously described with respect to opening 26 and a similar support plate 52. It is believed that it is not necessary to specifically define this dove-tail slot arrangement as it would be a matter of duplication. A crank handle 134 is to be manually turned which causes rotation of crank plate 136 which in turn rotates threaded shaft 138. This in turn causes longitudinal movement of the support plate 126 along a second axis with respect to the base 22. It is to be understood that the threaded rod 138 is connected to a member similar to extension 54 which is attached to the underside of the support plate 126. To insure against non-movement of the support plate 126, once a desired position has been established, the knob 140 may be rotated which in turn operates a set screw which binds against a bar similar to bar 48 and in turn binds against a floating, male, dove-tail bar similar to 38 which binds against a female, dove-tail, support plate similar to 52. There is a similar set screw which is operated by knob 142 to fixedly position the support plate 52.

A dial indicator 144 is mounted on the support plate 126. The dial indicator 144 is basically identical to dial indicator 80 with the exception that the dial face of the indicator 144 may be somewhat different. This difference has to do with the diameter of the cylinder 14 of the key 10. There are three different sizes of keys, small, medium and large. This difference will be known by the operator. The dial face of the dial indicator 144 will normally denote the three different values corresponding to small, medium and large. For a small type of key held within the collet 92, the support plate 126 is to be moved to the corresponding indicia for the small key on the dial face of the indicator 144. The same holds true for the medium and large type of key. This insures that the required depth of each of the grooves 18 is obtained with respect to the diameter of its particular cylinder 14. In other words, a cutting of the grooves 18 either too deep or too shallow is prevented.

The dial indicator 144 operates through a rod 146. The rod 146 is slidingly conducted through an opening formed within an upright stanchion 148. The upright stanchion 148 is fixedly mounted on the planar surface 24 of the base 22.

The operation of the tubular key cutting machine of this invention is as follows:

The operator takes the key 10 and inserts such within the collet 92 and the collet 92 is tightened by rotating of the knob 106 thereby fixing the key 10 with respect to the indexing plate 100. The indexing plate is pivoted with respect to the housing 120 to locate the indexing plate 100 in the zero position. This zero position would normally be with the protuberance 16 located at the three o'clock position. At this particular position, the locating pin 128 will cooperate within an opening 132. To insure against even slight movement of the indexing plate 100, the knob 116 is turned causing fixing of the sleeve 108 to the housing 120.

The operator then turns crank 136 through handle 134 until the ungrooved cylinder 14 of the key 10 just touches the end mill 78. This touching occurs at the first designated angular position which has been pre-selected by the operator. The operator then sets the indicator 144 to the zero position by adjusting the rod 146 so that the front face of rod 146 abutts with indicator stem face, similar to stem 88 and then turning wing nut 150 which moves a set screw through upright stanchion 148 to lock in position the rod 146.

The next step is for the operator to turn crank 58 through the handle 60 so that the end mill 78 is longitudinally spaced from the front face of the cylinder 14. The operator then turns the crank 136 a slight distance inward until the end mill just touches the outer edge 152 of the cylinder 14. The operator then sets the dial indicator 80 to the zero position. The operator then cranks backwards crank 136 so that the key 10 is spaced from the end mill 78.

At this time, the operator moves the end mill 78 the desired depth measured in 0.001 (one thousandths) of an inch. This depth will be predetermined by the operator. The desired depth is read by the dial indicator 80. The operator then tightens knob 142 to securely lock into position the support plate 52.

The motor 32 is then turned on by means of switch 66. The desired speed of the motor is set by knob 68. The operator begins to turn crank 136 until the end mill 78 engages the cylinder 14 of the key 10. The operator then proceeds to move through crank 136 until the desired depth of the groove 18 is obtained by reading of the dial indicator face of the dial indicator 144. The operator then backs off the key 10 from the end mill 78 producing the desired groove 18. This groove will be of the exact length and the exact depth that is required. It is to be noted that the groove created will be at the predetermined angular position, relative to protuberance 16, noting that the protuberance 16 is located at the zero position.

The operator then rotates the indexing plate to the next desired position (usually forty-five degrees) and the entire procedure is repeated. This continues until each of the grooves 18 have been correctly formed within the key cylinder 14.

The machine 20 of this invention, though designed in particular for cutting a tubular key, can be employed to cut keys other than tubular keys. This is accomplished through the use of attachments, either in the form of a different type of key supporting collet (instead of collet 92) or in the employing of a different type of cutting implement (instead of the end mill 78). Reference is now to be had to FIGS. 9-17 which show difference types of attachments in order to effect the manufacture of other types of keys.

Figure 9:
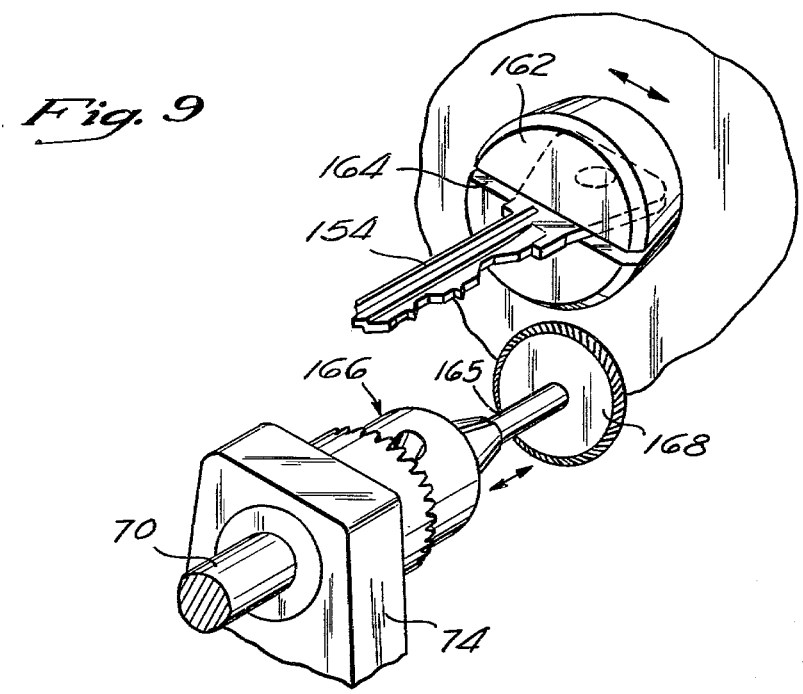
FIG. 9 is a diagrammatic, isometric view which shows a first attachment which can be employed in conjunction with the machine of this invention to manufacture a different type of key.
Figure 10A:
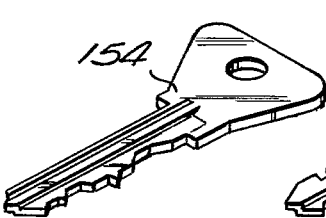
FIGS. 10a–10d are isometric views of different types of keys which could be manufactured using the structure of FIG. 9.
Figure 10B:
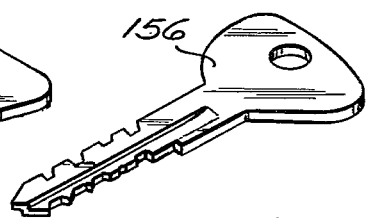
Figure 10C:
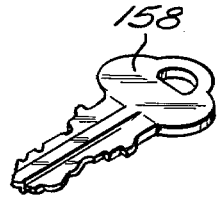
Figure 10D:
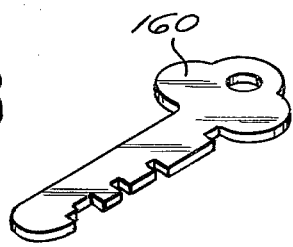

Reference is to be had to FIGS. 9-10d wherein different types of straight keys are shown. FIG. 10a shows a single cut straight key 154, while FIG. 10b shows a double cut straight key 156, FIG. 10c shows a straight key 158 which is cut on both sides of the key shank, and FIG. 10d shows a flat, safe deposit type key 160 which is cut on only one side of the shank of the key with the side walls of each of the cuts being perpendicular to the longitudinal axis of the key shank.

Referring particularly to FIG. 9, there is shown the key 154 which is mounted within a special type of key supporting collet 162. The collet 162 is basically similar to collet 92 with the primary difference being that there is a single transverse slot 164 located across the collet 162. The slot 164 is to accommodate the head portion of the key 154 and other similar type keys. By tightening of the knob 106, the key 154 becomes tightly held within the collet 162. When the forming of grooves along one edge of key blank 156 or 158 has been completed, the key blank 156 or 158 and the collet 162 can be relocated one hundred and eighty degrees by indexing the plate 100 whereby allowing similar cuts to be formed on the opposite side of key blank 156 or 158.

The drill bit 78 has been removed leaving exposed the shaft 70. Attached to the shaft 70 is a conventional chuck assembly 166. The chuck assembly 166 is what is frequently used in conjunction with drilling equipment wherein the chuck assembly is used to support a drill bit or arbor. The rotatable cutting tool which is a tapered milling cutter 168 is securely held by an arbor 165 and the chuck assembly 166. The chuck assembly 166 is fixedly secured by a set screw assembly to the shaft 70.

The cutting of the key 154 from a key blank is accomplished by moving the cutter 168 to each desired position along the edge of the key blank 154. The desired position will be determined from a blue print or other appropriate accurate written information. The depths of each particular cut in key blank 154 will also be determined by blue prints or other accurate written information or the depths and locations may be measured directly from another key 154 which is to be duplicated for any number of variable reasons.

Figure 11:
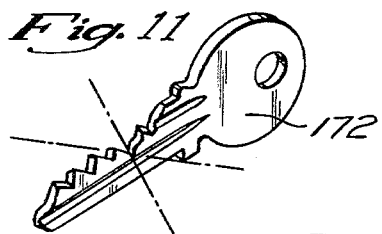
FIG. 11 is an isometric view of a still further different key which can be manufactured with the machine of this invention.
Figure 12:
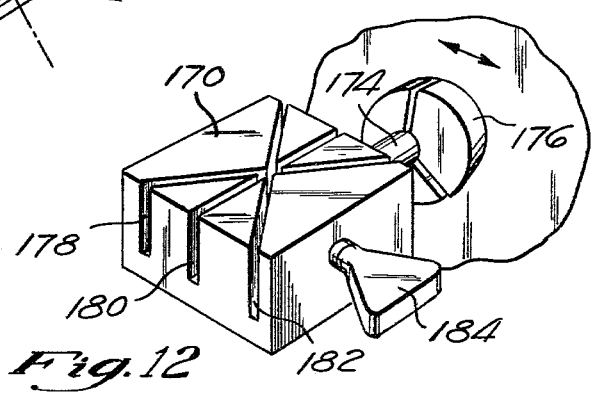
FIG. 12 is an isometric view of an attachment which is to be employed in conjunction with the key supporting collet in order to manufacture the key of FIG. 11.
Figure 13:
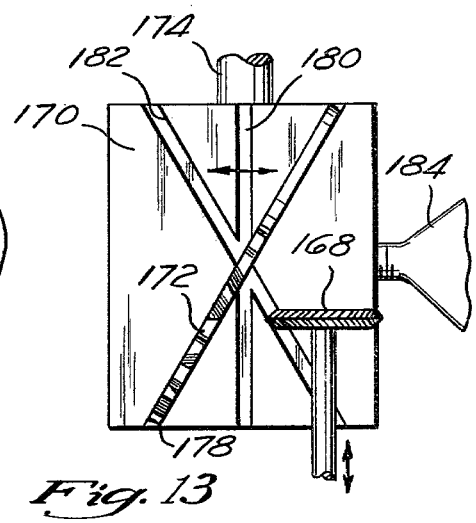
FIG. 13 is a top plan view of the attachment of FIG. 12 depicting the movement of the cutter across the key.

Referring particularly to FIGS. 11–13, there is shown an attachment in the form of a mounting block 170 which is to be used to cut a still further type of key 172. The mounting block 170 is fixedly mounted to a rod 174. The rod 174 is to be located in conjunction with another type of collet 176 which is adapted to connect with the rod 174. The collet 176 is basically similar to the collet 92 and is operated in the same manner.

The mounting block 170 has longitudinal slots 178, 180, and 182 formed therein. Slot 180 is located along the longitudinal center axis of the collet 176. The slots 178 and 182 are each displaced at some desired angle from the slot 180 and crossing slot 180 in an X-configuration.

The key 172 can be located in either slot 178, 180, or 182. When so located, thumb screw 184 is tightened which fixedly locks the position of the key 172. The cutter 168 is to be moved transversly across the cutter 168. This produces angular cuts within the key 172. Some types of keys do employ the use of such angular cuts and therefore by using the mounting block 170, the machine 20 of this invention can be used to make such special types of keys. Depths of cuts can be varied by varying the size of the diameter of cutter 168 or lowering and/or raising mounting block 170 or a portion thereof.

Figure 14:
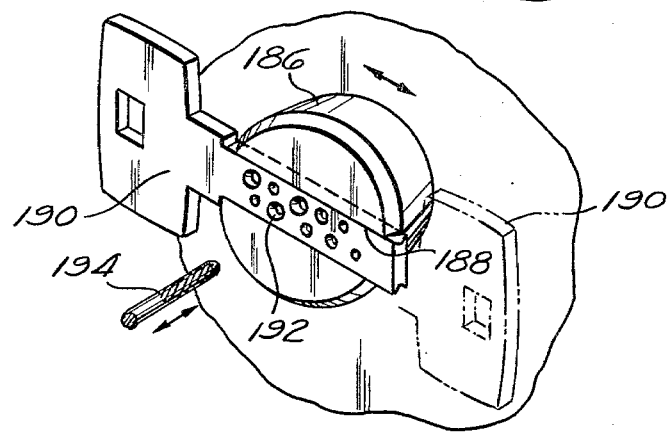
FIG. 14 is an isometric view of a still further different key which is supported within a particular key supporting collet which can be manufactured by the machine of this invention.
Figure 15:
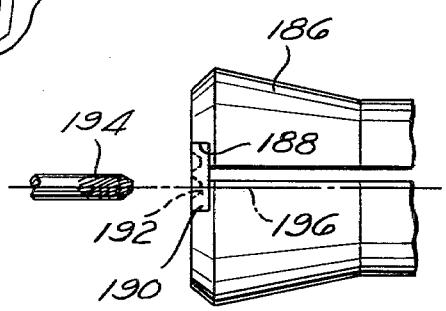
FIG. 15 is a side view of the structure of FIG. 14.

Referring particularly to FIGS. 14 and 15, there is shown a different type of key supporting collet 186 which includes a longitudinal transverse slot 188. A key blank 190 is mounted within the slot 188. The keying identification, such as recesses 192 are to be formed within the sides of the shank of the key 190 as shown within FIGS. 14 and 15. A drill bit or full radiused end mill 194 is used in the cutting operation. It is to be noted that the recesses 192 may be located in two rows, one above the other. The transverse slot 188 is located with respect to the longitudinal center line 196 of the collet 186 and of the drilling bit 194 so the appropriate recess along the lower row can be formed. The key 190 is then rotated one hundred and eighty degrees to the phantom line position shown in FIG. 14 and then the same or different recesses of the key shank can be formed in the opposite side of the key blank and on the same level in reference to the center line. The key can then be turned over and the procedure duplicated on the back side of the key so that both sides of the key shank can be appropriately recessed.

Figure 16:
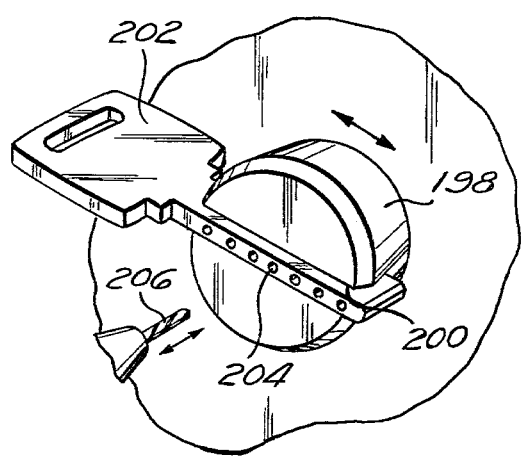
FIG. 16 is a view similar to FIG. 14 but of a still further different key which can be manufactured with the machine of this invention.
Figure 17:
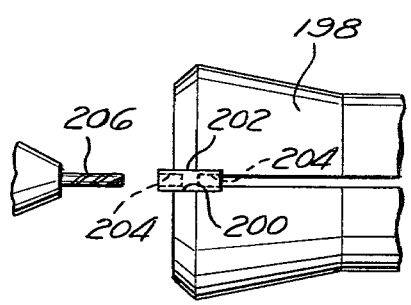
FIG. 17 is a side view of the structure shown within FIG. 16.

Referring particularly to FIGS. 16 and 17, there is shown a different type of key supporting collet 198 which has a transverse key supporting slot 200. The key 202 is to be located within the slot 200 and holes 204 are to be located within the bottom and/or top edge of the key 202 by means of a drill bit or end mill 206. The key 202 can be removed and reinserted in an up-side-down manner within the slot 200 so that similar types of holes 204 can be located within the top edge of the key. Within each of the holes 204 is to be located a small pin magnet (not shown). Each pin magnet is to respectively attract or repel (depending on the position of the magnet) a locking pin within the locking tumbler mechanism of a lock.

What is claimed is:

1. A machine for manufacturing keys comprising:

a base;

cutting means including a cutter rotatable about a first axis, said cutting means being movably mounted by first movement means on said base, said first movement means comprising a first crank assembly and a first dovetail slot assembly, manual operation of said first crank assembly causes movement of said cutting means within said first dovetail slot assembly parallel to said first axis;

key support means movably mounted by second movement means on said base, said second movement means comprising a second crank assembly having a second dovetail slot assembly, manual operation of said second crank assembly causes movement of said tubular key support means within said second dovetail slot assembly along a second axis transverse to said first axis, a tubular key mounted within said key support means parallel to said second axis, to tightly hold said tubular key in a desired position, said key support means including a housing and an indexing plate assembly, said indexing plate assembly being pivotable about a pivot axis upon said housing, the longitudinal center axis of the said tubular key coinciding with said pivot axis, said indexing plate including a measuring scale to facilitate the accurate locating of said indexing plate in a certain desired pivotal position relative to said housing to thereby facilitate the forming of a plurality of spaced-apart longitudinal grooves about the periphery of said tubular key, said indexing plate including locking means for fixing of said indexing plate at a particular established position in respect to said key support means, said locking means comprising a locating pin lock and a separate screw engaging lock, said locating pin lock to fix the position of said indexing plate at any one of several pre-established positions, said screw engaging lock to fix the position of said indexing plate at any position;

a first measuring indicator connected to said first movement means, said first measuring indicator having a first measurement scale formed on a first indicator face and a first pointer to be movable across said first measurement scale, said first measurement scale to be manually moved relative to said first pointer to be setable at an initial (zero) measuring value when said cutting means has been moved longitudinally to just touch the said tubular key;

a second measurement indicator connected to said key support means, said second measurement indicator having a second measurement scale formed on a second indicator face and a second pointer to be movable across said second measurement scale, said second measurement scale to be manually moved relative to said second pointer to be settable at an initial (zero) measuring value with the said tubular key transversely moved to just touch said cutting means; and said cutting means is to be longitudinally moved to a desired value and the said tubular key is also to be moved to a desired transverse value causing a groove to be cut within the said tubular key.

2. The machine as defined in claim 1 wherein:

the movement of said cutting means upon said base being lineal, the movement of said key support means upon said base being lineal, the direction of movement of said cutting means being perpendicular to the direction of movement of said key support means.

3. The machine as defined in claim 2 wherein:

said cutting means being operated by a motor, the speed of said motor being variable so as to vary the speed of said cutting means.

* * * * *